Patented Feb. 24, 1931

1,794,260

UNITED STATES PATENT OFFICE

THEODOR THORSSELL AND AUGUST KRISTENSSON, OF KASSEL, GERMANY

PROCESS FOR THE PRODUCTION OF POTASSIUM CARBONATE

No Drawing. Application filed March 26, 1930, Serial No. 439,261, and in Germany April 16, 1929.

This invention comprises an improvement in or modification of the process for the production of potassium carbonate claimed in our prior patent application No. 314,842.

According to the process forming the subject matter of the said patent, solid potassium carbamate is obtained from potassium chloride by conversion with ammonium carbamate or carbonic acid in liquid, anhydrous or slightly aqueous ammonia, which potassium carbamate is converted by the addition of water and heating into potassium bicarbonate and the latter by known methods into potassium carbonate again.

The present invention relates to the use of this process for the working up crude sylvinitic salts, in which case potash and soda are obtained simultaneously.

For carrying out the process the crude salt is finely ground and stirred, exactly as in the process forming the subject matter of the said prior patent, with ammonium carbamate ($NH_4CO_2NH_2$) or with carbonic acid in liquid ammonia which is anhydrous or contains a little water. Potassium chloride and sodium chloride are thus converted into solid carbamates ($KCO_2NH_2$ and $NaCO_2NH_2$ respectively). All the chlorine passes into solution as ammonium chloride in liquid ammonia. The substance at the bottom of the liquid is separated from the solution and washed with ammonia. The mother lye is treated as described in our said prior patent, and the liquid ammonia thus recovered passes back into the process. The substance settled at the bottom, which in addition to potassium and sodium carbamates, contains all the constituents in the crude salt and insoluble in liquid ammonia, is treated with water, the carbamates being converted into bicarbonates and being separated from one another and from the other constituents by known methods.

Having now particularly described and ascertained the nature of our said invention and in what manner the same is to be performed, we declare that what we claim is:—

1. A process for the production of potassium carbonate from crude sylvinitic salts, with the simultaneous production of sodium carbonate, consisting in treating the said crude sylvinitic salt with ammonium carbamate in substantially anhydrous liquid ammonia, converting the resulting potassium carbamate and sodium carbamate into potassium bicarbonate and sodium bicarbonate by treating with water, separating the potassium bicarbonate and sodium bicarbonate from one another and from the impurities present in the said crude sylvinitic salt, and converting the said potassium bicarbonate and sodium bicarbonate into potassium carbonate and sodium carbonate, as set forth.

2. A process for the production of potassium carbonate from crude sylvinitic salts with the simultaneous production of sodium carbonate, consisting in treating the said crude sylvinitic salt with carbonic acid in substantially anhydrous liquid ammonia, converting the resulting potassium carbamate and sodium carbamate into potassium bicarbonate and sodium bicarbonate by treating with water, separating the potassium bicarbonate and sodium bicarbonate from one another and from the impurities present in the said crude sylvinitic salt, and converting the said potassium bicarbonate and sodium bicarbonate into potassium carbonate and sodium carbonate as set forth.

In testimony whereof we have signed our names to this specification.

THEODOR THORSSELL.
AUGUST KRISTENSSON.